(12) United States Patent
Crawford

(10) Patent No.: US 6,678,937 B2
(45) Date of Patent: Jan. 20, 2004

(54) ALTERNATIVE METHOD FOR SEALING ALL-METAL VACUUM JOINTS

(75) Inventor: Charles K. Crawford, Wilton, NH (US)

(73) Assignee: Kimball Physics, Inc., Wilton, NH (US)

( * ) Notice: Subject to any disclaimer, the term of this patent is extended or adjusted under 35 U.S.C. 154(b) by 140 days.

(21) Appl. No.: 10/014,163

(22) Filed: Oct. 26, 2001

(65) Prior Publication Data

US 2002/0050691 A1 May 2, 2002

Related U.S. Application Data

(60) Provisional application No. 60/243,527, filed on Oct. 26, 2000.

(51) Int. Cl.[7] .............................. B23P 11/02; B23P 11/00
(52) U.S. Cl. ............................................ 29/508; 29/505
(58) Field of Search .......................... 29/508, 506, 505, 29/469, 514, 743; 138/89, 96 R; 405/91, 114

(56) References Cited

U.S. PATENT DOCUMENTS

| | | | | |
|---|---|---|---|---|
| 4,538,503 A | * | 9/1985 | Hachiro | 91/376 R |
| 5,678,607 A | * | 10/1997 | Krywitsky | 138/89 |
| 6,196,763 B1 | * | 3/2001 | Obermeyer | 405/91 |

* cited by examiner

*Primary Examiner*—John C. Hong
(74) *Attorney, Agent, or Firm*—Hayes Soloway PC

(57) ABSTRACT

A clamping system for high or ultra-high vacuum system components including a clamping member surrounding a flange of the vacuum system component. A bead along the inside diameter of the clamping member engages a groove in the peripheral surface of the flange. When a clamping force is applied to the clamping member, as by a bolt, the force is transmitted to the flange providing sufficient clamping force to form a vacuum seal.

11 Claims, 7 Drawing Sheets

US 6,678,937 B2

ALTERNATIVE METHOD FOR SEALING ALL-METAL VACUUM JOINTS

CROSS-REFERENCE TO RELATED APPLICATIONS

This application claims the benefit of U.S. provisional application Ser. No. 60/243,527 filed on Oct. 26, 2000, the teachings of which are incorporated herein by reference.

FIELD OF INVENTION

This invention relates to clamping systems for high and ultra-high vacuum systems.

BACKGROUND OF THE INVENTION

Vacuum systems find wide applications in research, education, product development, and production. Typical systems are comprised of independent and interchangeable components. Components include testing chambers, pumps, gauges, valves, specimen holders, electron sources, ion sources, photon sources, molecular beam sources, detectors of various types, etc.

Processes or experiments that require high or ultra-high vacuum (UHV) currently employ all metal vacuum joints. A typical all-metal joint, such as that described in U.S. Pat. No. 3,208,758, is illustrated in FIG. 1. Such a joint comprises a flange 20 (FIG. 2) that includes an annular recess 26 and an annular knife edge 30. The flange 20 is intended for mating with another like flange 24 separated by a soft, metallic gasket 34. The opposing knife edges 30, 32 are pressed into the gasket 34 by tightening bolts 38 forming the UHV seal.

In UHV systems, the level of vacuum is dependant upon the speed of the vacuum pumps, the leak rates of the vacuum joints and vacuum walls, the surface area of the chamber and pumping lines, and the surface roughness of the interior components. Cleanliness or purity of the vacuum environment depends upon the interior component's material, forming method, and surface finish. The practicality of a vacuum system depends on the ease of access for changing specimens, the required down-time to trouble shoot and to do repairs, and the ease with which components may be added and removed from the system. The expense of a vacuum system lies in the cost of components, the required pump types and speeds, and the number and type of extra adapters needed to attach components to a system. Methods of accurately placing testing apparatus, processing equipment, or samples within a system are often required for an experiment or process. The prior art flanges do not adequately optimize some of these requirements, in some cases.

Standard thickness flanges depend on the thickness of the flange to transfer force from the bolts to the sealing gasket in order to crush the gasket and form the seal. This requires that mating flange configurations be one flange with clear bolt holes and one flange with either clear or tapped bolt holes. If both flanges have clear holes, then there must be room for bolt heads on one side of the flange pair and for nuts on the other. If at least one of the flange pairs is not rotatable, then the possible mounting configurations are limited to the number of bolt holes.

Methods for directly attaching two vacuum components that both have tapped holes currently involve one of several options, all of which significantly increase size or complexity of the vacuum system. One method includes inserting an adapter comprised of two flanges on each end of a thin wall tube. Unfortunately, the tube has to be long enough to provide bolt clearance. Another method uses double-sided couplers that bolt to the two components. Such a coupler is described in Crawford U.S. Pat. No. 5,671,956. However, even couplers of this type add length. Adding length and surface area significantly decreases molecular conductance, as well as increasing the overall system size.

SUMMARY OF THE INVENTION

A clamping system for a vacuum system comprising a pair of facing flanges to be joined as part of a vacuum system, each having an external mounting groove in the outer perimeter of the flange. Clamp members are attached to the external mounting groove of each of the flanges. Bolts are disposed extending between the clamp members and are configured to draw the clamp members toward each other. The interaction between the clamp member bead and the groove on the flange transmits the closing force from the bolts to a sealing surface on the flange, whereby sufficient compressive force may be generated to create a vacuum tight seal.

Consistent with the present invention, it is possible to insert an additional component or components between two flanges, using only minimal space. The decrease in required space has the advantage of increasing the conductance of the vacuum system. Also, since the present invention does not require modifications to the inserted component or components, industry standard parts may be used in conjunction with the present invention. This last feature is particularly useful in mounting industry standard valves, as opposed to specially modified or specially manufactured valves. Furthermore, because all of the surfaces of the clamp members are machined, and there are no welds, all parts may be fully disassembled. Additionally, it is possible that two vacuum components, both with tapped holes, may be directly attached to each other. Arbitrary angular orientations are possible between non-rotatable flanges. Alternatively, the external mounting grooves of the present invention may be utilized for attachment of support structures or apparatus external to the vacuum system. Because the grooves are symmetric around the perimeter of the flange, support structures may have arbitrary angular orientation with respect to the flange.

BRIEF DESCRIPTION OF THE DRAWINGS

Exemplary embodiments of the invention are set forth in the following description and shown in the drawings, wherein.

DETAILED DESCRIPTION OF THE INVENTION

Figure 1:
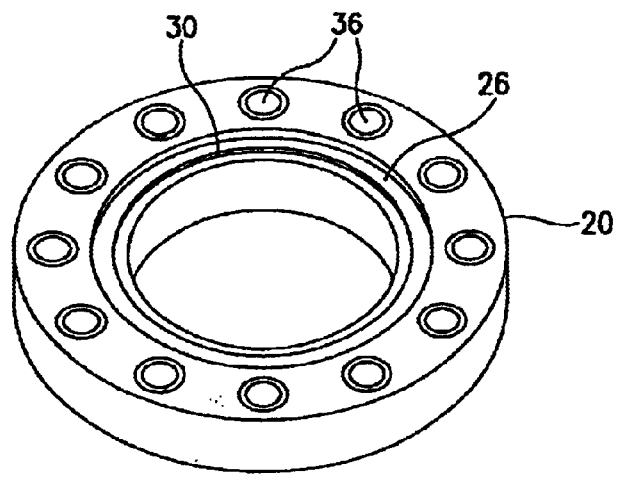
FIG. 1 is a perspective view of a prior art flange.
Figure 2:
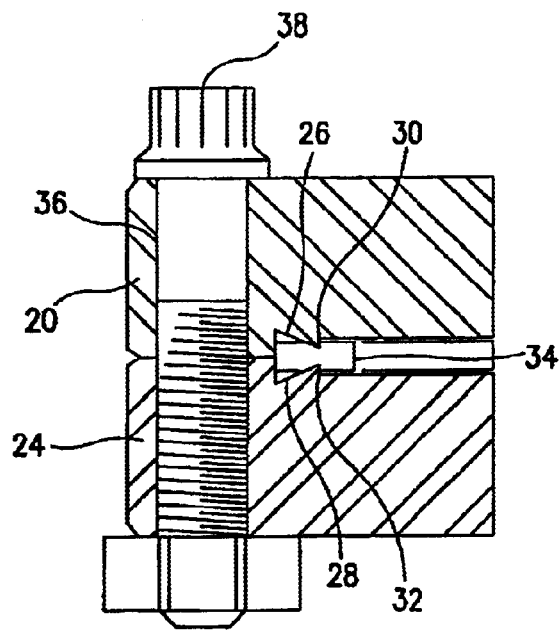
FIG. 2 shows an all metal seal of the prior art in cross-sectional view.
Figure 3:
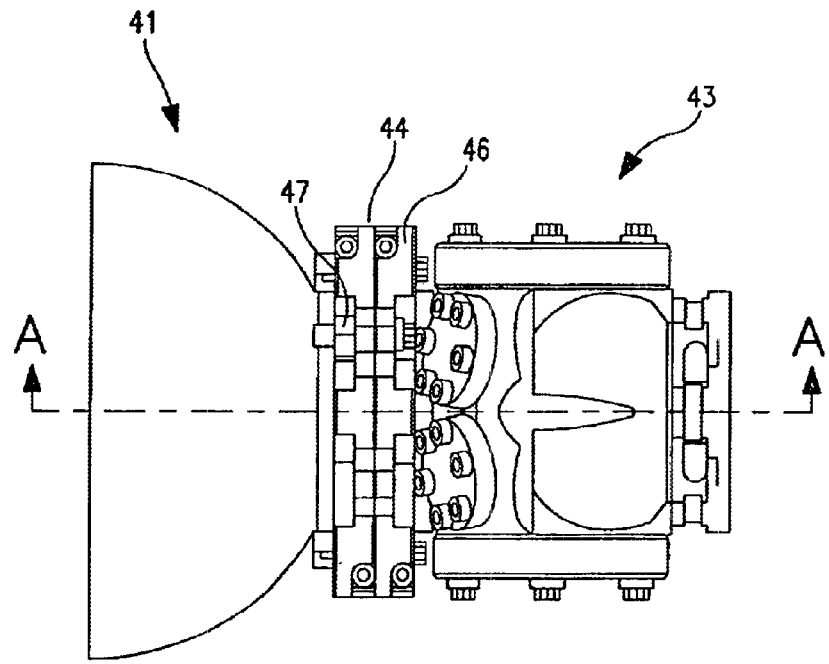
FIG. 3 is a plan view illustration of an exemplary clamping system consistent with the present invention.
Figure 4:
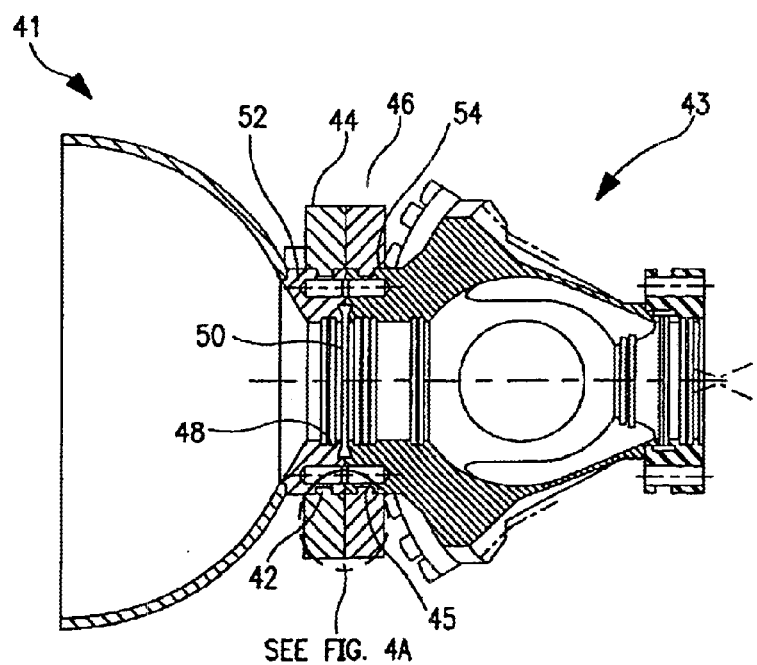
FIG. 4 is a sectional view of the exemplary system illustrated in FIG. 3, as taken along section line A—A.

Referring to first to FIGS. 3 and 4, an exemplary embodiment of the clamping system consistent with the present invention. FIG. 3 shows a first and a second vacuum system component 41 and 43 each having a corresponding clamp member 44 and 46 respectively attached thereto. The two clamp members 44 and 46 are further joined or secured to one another using auxiliary bolts, one of which is indicated at 47.

Figure 4A:
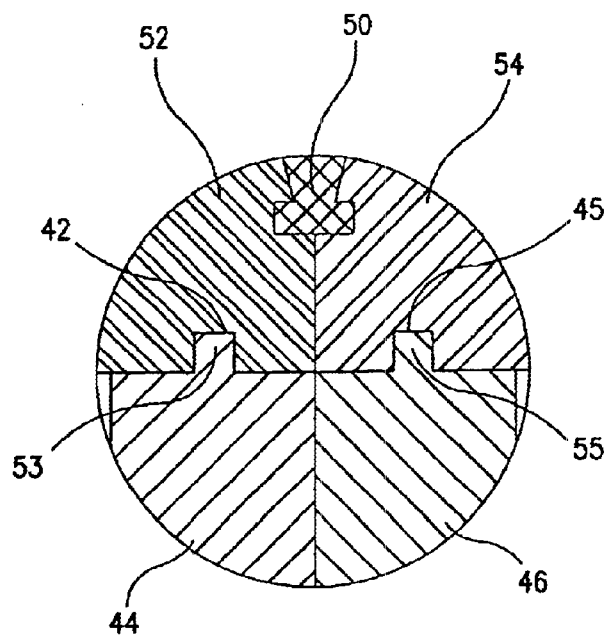
FIG. 4A is a detailed view of the indicated region of FIG. 4.

Turning to FIG. 4, a sectional view of the assembly shown in FIG. 3 is illustrated. The individual clamp members 44 and 46 are each attached to respective flanges 52 and 54 of vacuum system components 41 and 43. Each of the flanges 52 and 54 comprise a groove 42 and 45 formed in the outer edge of each flange 52 and 54. The attachment of the clamp members 44 and 46 may advantageously be achieved by means of beads 53 and 55 projecting from the clamp members 44 and 46. It should be appreciated that the beads 53 and 55 may be either continuous or discontinuous, and may also be either integral with the clamp members 44 and 46, or may be a separate component secured thereto. The interaction of the beads 53 and 55 with the grooves 42 and 45 about a substantial portion of the circumference of each flange 52 and 54 serves to securely affix each clamp member 44 and 46 to the flanges 52 and 54. These features of this exemplary embodiment are illustrated in better detail in FIG. 4A, which is an enlarged view of the pertinent regions of FIG. 4.

With both of the individual clamp members 44 and 46 secured to the corresponding flanges 52 and 54, the vacuum system components 41 and 43 may be joined to one another by means of auxiliary bolts disposed around, but spaced outside of, the perimeter of the flanges 52 and 54. One such auxiliary bolt is indicated at 47. The auxiliary bolts 47 apply a compressive force on the flanges 52 and 54 through the clamp members 44 and 46. This compressive force presses the knife edges 48 and 49 of the flanges 52 and 54 into the metallic gasket 50, thereby forming a vacuum tight seal between the first and the second vacuum system components 41 and 43.

Figure 5:
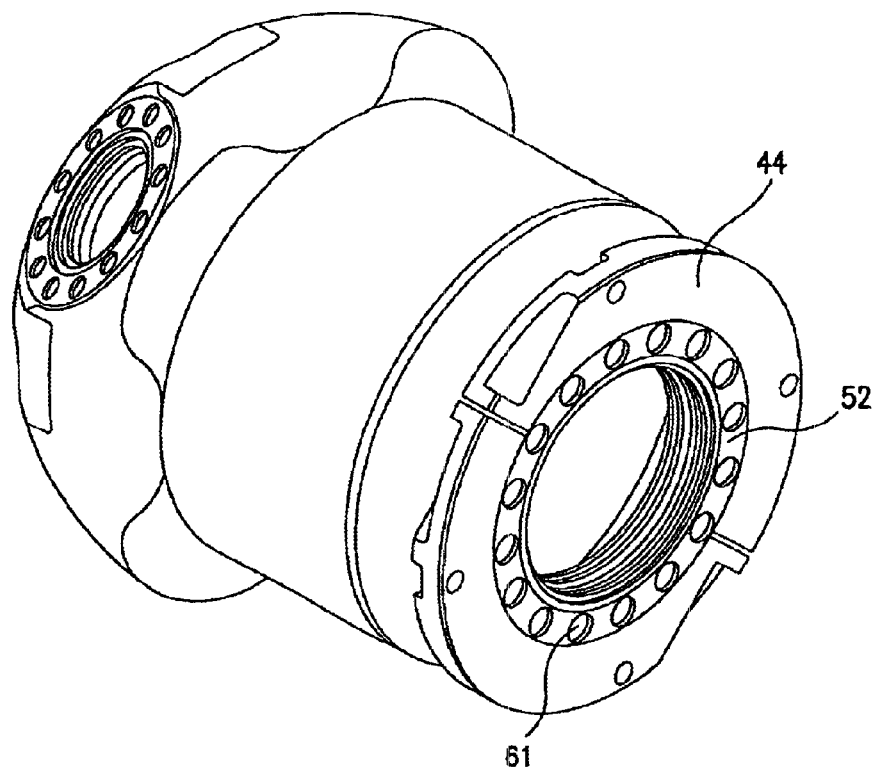
FIG. 5 is a perspective view of an exemplary clamp member disposed on flange.

Turning to FIG. 5, one half of the above-described clamping system is illustrated in perspective view. As shown, the clamping member 44 is disposed around a flange 52. The illustrated flange 52 comprises a plurality of bolt holes 61 disposed about the circumference of the flange 52. Conventional clamping utilizes two such flanges clamped together by way of bolts passing between these bolt holes 61 and similarly arranged holes in a mating flange. It will be appreciated that successful sealing of two such flanges can only be achieved if the bolt holes of each flange are of the same size and disposed about the same diameter. Furthermore, the individual vacuum components may only be oriented in the limited rotational increments provided for by the bolt holes. Consistent with the present invention, the clamping system is not indexed to the vacuum system components, and therefore alignment of flange bolt holes, or other features, is irrelevant to achieving a vacuum tight seal.

Referring to FIGS. 6 through 9, the individual components of an exemplary clamp consistent with the present invention are illustrated. For illustrative purposes, a single clamp member 44 is shown generally in FIG. 7. Each clamp member 44 may advantageously be divided into at least two sections 44A and 44B. This division is made in order for clamp member 44 to be applied to the flange 52 while permitting the beads 53 to engage the groove 42 of the flange 52. While in the exemplary embodiment the clamp member 44 is bisected into two pieces 44A and 44B, it will be appreciated that the clamp member may be further divided, advantageously so depending upon the geometry of the flange, which may be other than circular.

Figure 6:
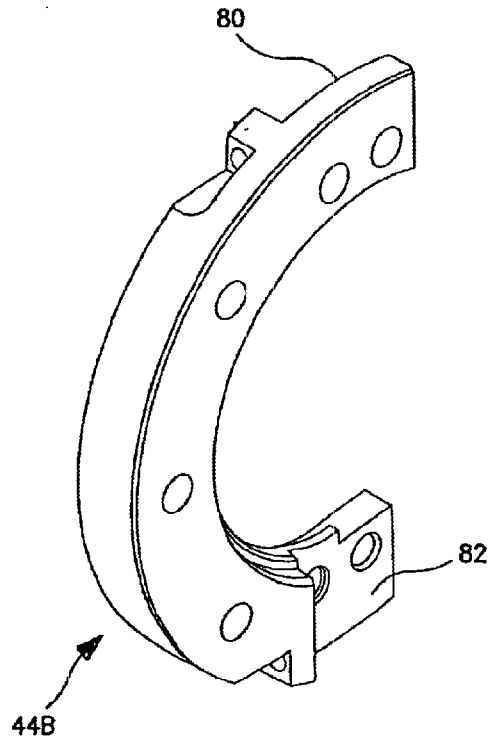
FIGS. 6 through 9 illustrate various exemplary details and features of an exemplary clamp member consistent with the present invention.
Figure 7:
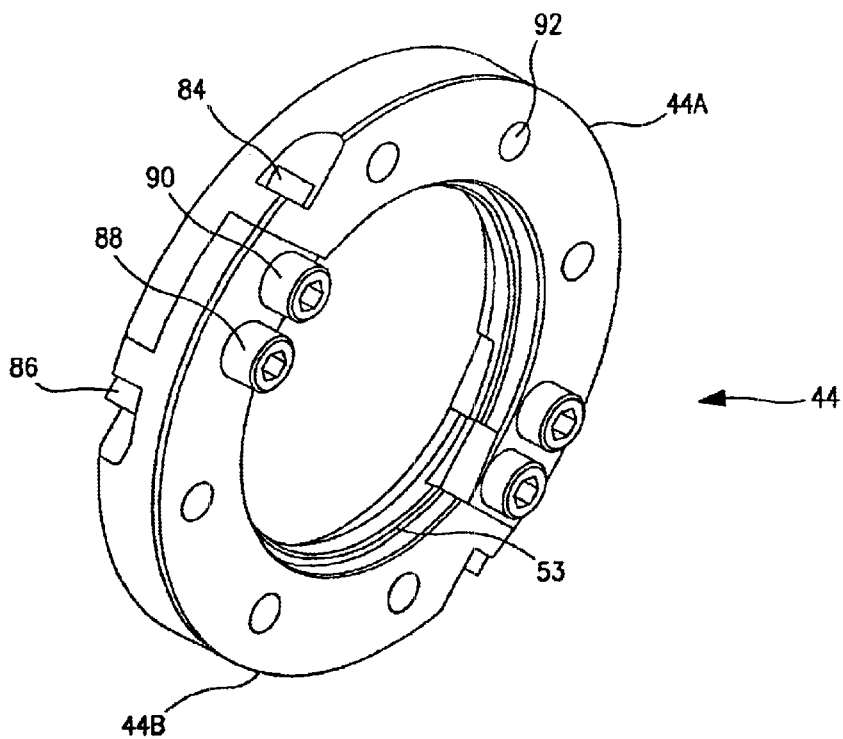

In the interest of maintaining the clamp member 44 securely disposed on the flange 52, it is desirable that the individual portions of the bisected clamp member 44A and 44B are capable of being rejoined in a strong manner. Accordingly, while not necessary, the clamp member section 44A and 44B may mate using a lap joint, or similar. As shown in FIG. 6, each clamp member section 44A may be a generally semicircular member terminating in alternating laps 80 and 82. With reference to FIG. 7, the clamp member sections 44A and 44B may be joined by circumferentially oriented bolts 84 and 86 at each lap joint, and/or by bolts 88 and 90 passing through the thickness of the clamp member 44.

Figure 8:
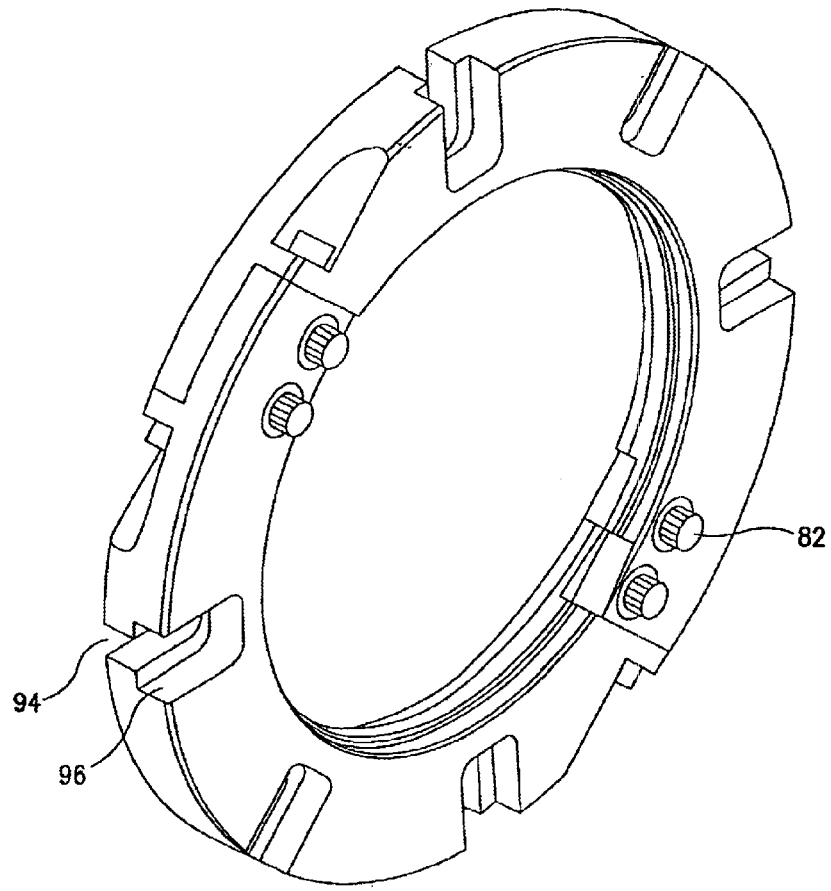

As discussed above, after the clamp members 44 and 46 have been appropriately secured to respective flanges 52 and 54, a seal is achieved by applying a compressive force between the clamp members 44 and 46. The compressive force is most easily generated by auxiliary bolts 47 passing between the clamp members 44 and 46. The auxiliary bolts 47 may extend between the respective clamp members 44 and 46 through bolt holes 92 disposed about the circumference of clamp members 44 and 46, as indicated in FIG. 7. Alternately, the auxiliary bolts 47 may extend between the clamp members 44 and 46 via slots or cutouts 94 in each clamp member, as indicated in FIG. 8. According to this last embodiment, the slot 94 may comprise a stepped slot, wherein the larger region of the slot 96 may be configured to receive a bolt head and/or a nut.

Figure 9:
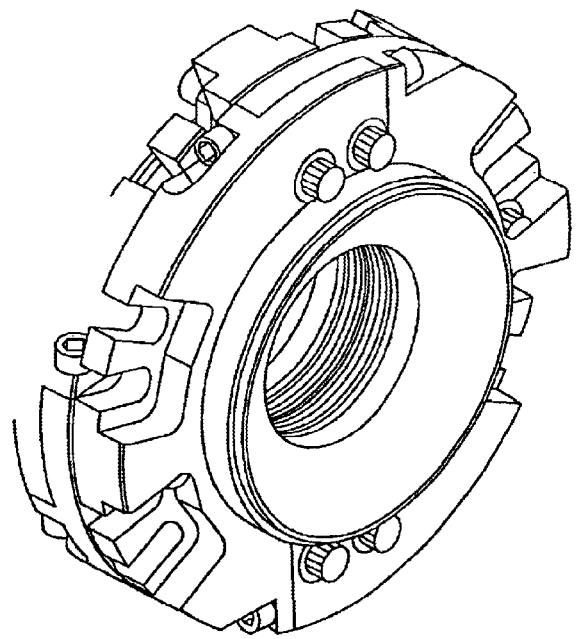

With further reference to FIGS. 8 and 9, the clamp members may be configured with special mounting features, such as bolting facilities 82, providing mounting locations for externally mountable apparatus. In this manner, external systems such as heating systems, cooling systems, etc. may be located adjacent to the vacuum system by mounting to the clamping system. Additionally, these features may be used for attaching support structures to the relevant portions of the vacuum system. Alternately, external systems may advantageously be attached to the grooves disposed in the flange members. The symmetrical configuration of the grooves around the perimeter of the flanges permit supports structures or external systems to be mounted to the vacuum system with an arbitrary angular orientation. Accordingly, such support structures and external systems may be mounted to a vacuum system in such a manner that no undue stresses or strains are experienced by the vacuum system.

Figure 10:
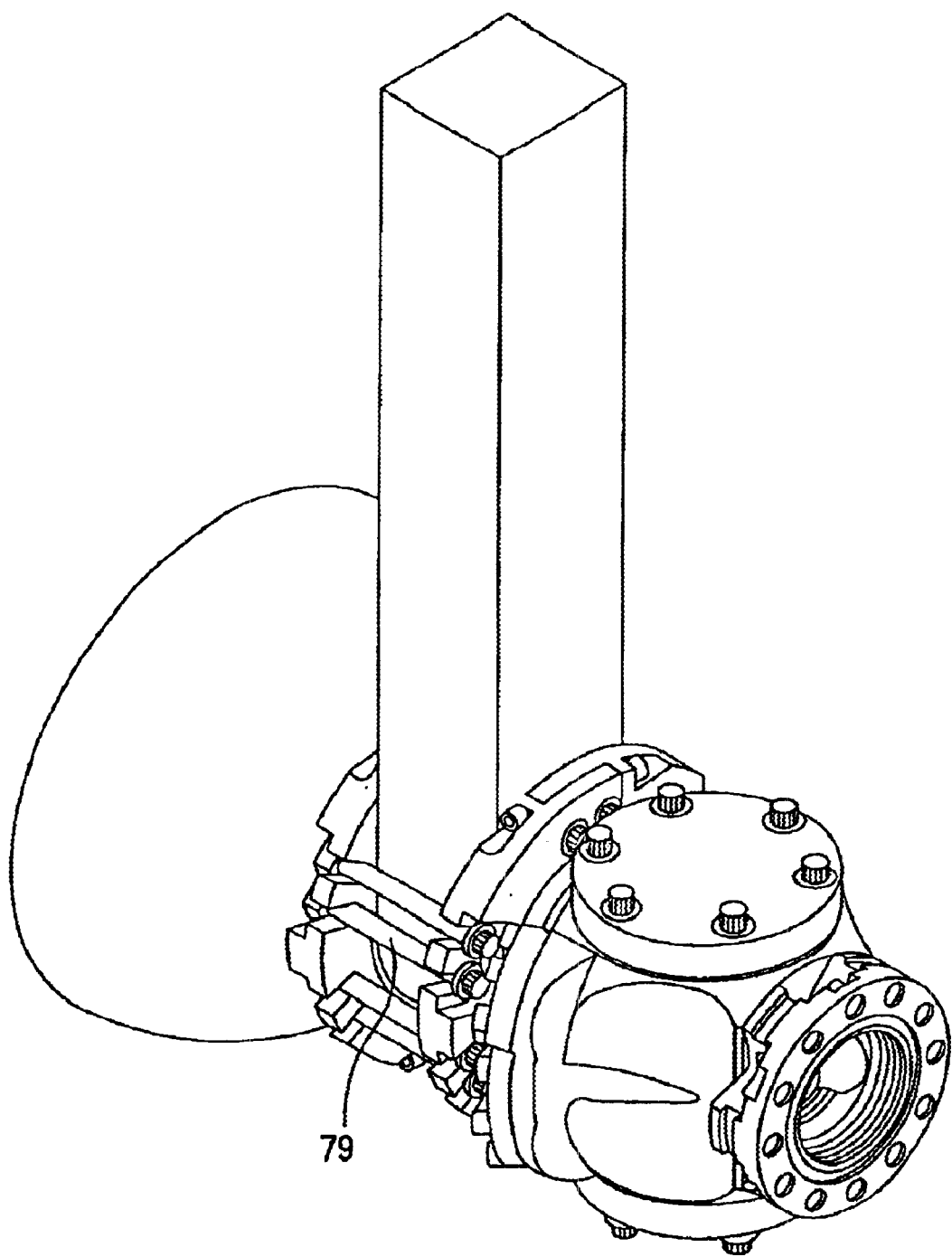
FIGS. 10 through 12 illustrate an alternate exemplary employment of the clamping system consistent with the present invention.
Figure 11:
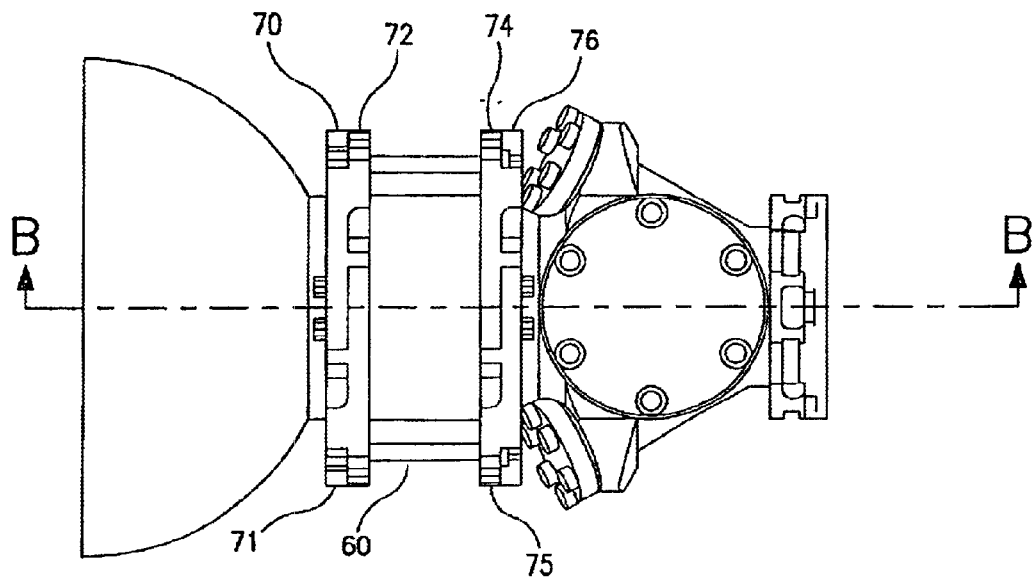
Figure 12:
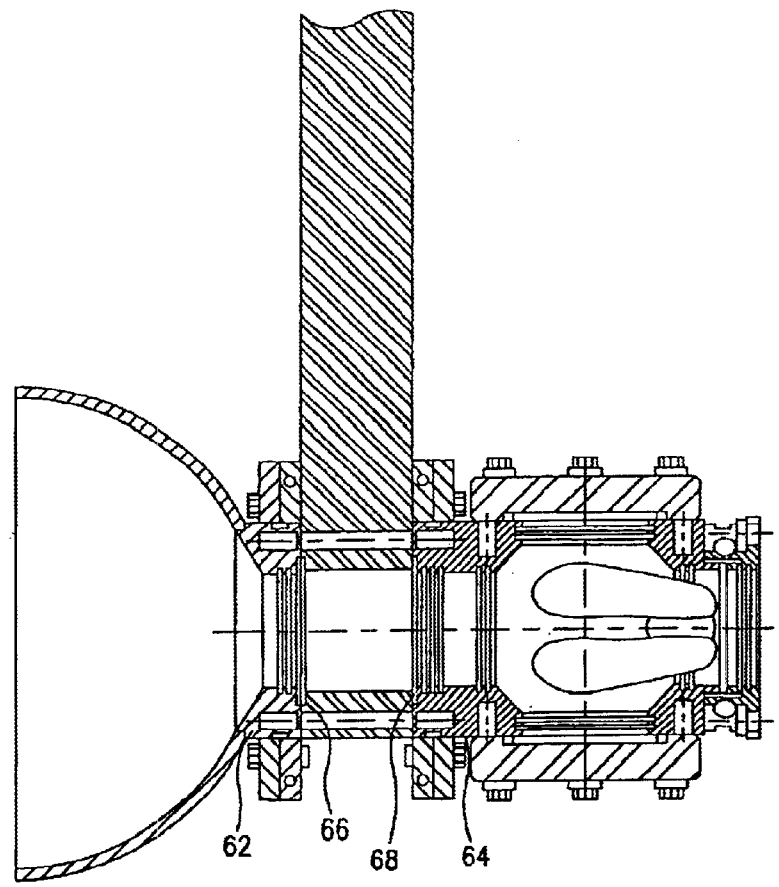

In a final illustrative exemplary embodiment, the clamping system consistent with the present invention may be employed to incorporate components into a vacuum system, wherein the component may be disposed between two flanges. Such an embodiment is illustrated in FIGS. 10 through 12. With particular reference to FIGS. 11 and 12, a valve 60 is shown disposed between two flanges 62 and 64. Each of the flanges is fitted with a clamp member 71 and 75. Consistent with the previous disclosure, each clamp member 71 and 75 comprises two individual clamp member portions 70, 72 and 74, 76 respectively. Each of the two flanges 62 and 64 is sealed against the valve 60 using a conventional metal gasket 66 and 68 and knife edge sealing surfaces (not shown). The two clamp members 71 and 75 are drawn toward one another, therein applying the compressive force necessary to seal metal gaskets 66 and 68, by auxiliary bolts, one of which is indicated at 79 in FIG. 10. It should be appreciated that the width of valve 60, or similar component which may be accommodated, is only limited by the available length of auxiliary bolts 79.

Further embodiments of the exterior flange mounting grooves and exterior clamp members may obviously be configured to accommodate different industry standard flange sizes, and different exterior mounting arrangements. Longer length versions may also be used for mounting larger apparatus. Along the same lines, tees and crosses of various sizes are also contemplated herein.

Accordingly, while the present invention has been disclosed with reference to particular exemplary embodiments, the invention herein is susceptible to many variations and alteration that will be obvious to one having skill in the art, without materially deviating from the spirit of the invention. Therefore, the invention should not be limited to the exemplary embodiments disclosed above, but rather only by the claims appended hereto.

What is claimed is:

1. A method of joining a first vacuum system component having a flange and a second vacuum system component having a flange, the method comprising:
   securing a first clamp member around the perimeter of the first vacuum system component flange, the first clamp member having a first contact surface;
   securing a second clamp member around the perimeter of the second vacuum system component flange, the second clamp member having a second contact surface; and coupling the first clamp member and the second clamp member, whereby a compressive force urges the first contact surface to come into contact with the second contact surface.

2. The method according to claim 1 wherein the step of securing the first clamp member around the perimeter of the first vacuum system component flange comprises providing a bead on the first clamp member, the bead engaging a groove in a peripheral edge of the first vacuum system component flange.

3. The method according to claim 1 wherein the step of securing the second clamp member around the perimeter of the second vacuum system component flange comprises providing a bead on the second clamp member, the bead engaging a groove in a peripheral edge of the second vacuum system component flange.

4. The method according to claim 1 wherein coupling the first clamp member and the second clamp member comprises providing a threaded fastener extending between the first clamp member and the second clamp member.

5. The method according to claim 1, wherein coupling the first clamp member and the second clamp member comprises tightening a bolt extending through a first opening in the first clamp member and a second opening in the second clamp member.

6. The method of claim 1, wherein the step of securing the first clamp member around the perimeter of the first vacuum system component flange comprises coupling two or more identical parts together.

7. A method of joining a first vacuum system component having a flange and a second vacuum system component having a flange, the method comprising:
   securing a first clamp member around the perimeter of the first vacuum system component flange;
   securing a second clamp member around the perimeter of the second vacuum system component flange;
   coupling the first clamp member and the second clamp member, whereby a compressive force urges the first vacuum system component flange towards the second vacuum system component flange; and
   providing a third vacuum system component disposed between the first vacuum system component and the second vacuum system component, and whereby coupling the first clamp member and the second clamp member seals the first vacuum system component to a first portion of the third vacuum system component and seals the second vacuum system component to a second portion of the third vacuum system component.

8. The method according to claim 7, wherein the step of securing the first clamp member around the perimeter of the first vacuum system component flange comprises providing a bead on the first clamp member, the bead engaging a groove in a peripheral edge of the first vacuum system component flange.

9. The method according to claim 7, wherein the step of securing the second clamp member around the perimeter of the second vacuum system component flange comprises providing a bead on the second clamp member, the bead engaging a groove in a peripheral edge of the second vacuum system component flange.

10. The method according to claim 7, wherein coupling the first clamp member and the second clamp member comprises providing a threaded fastener extending between the first clamp member and the second clamp member.

11. The method of claim 7, wherein the step of securing the first clamp member around the perimeter of the first vacuum system component flange comprises coupling two or more identical parts together.

* * * * *